(12) United States Patent
Sheen et al.

(10) Patent No.: US 10,374,882 B2
(45) Date of Patent: *Aug. 6, 2019

(54) SYSTEMS AND METHODS FOR IDENTIFYING CAUSES OF QUALITY DEGRADATION IN WIRELESS NETWORKS

(71) Applicant: Futurewei Technologies, Inc., Plano, TX (US)

(72) Inventors: Baoling S. Sheen, Kildeer, IL (US); Ying Li, Bridgewater, NJ (US); Jin Yang, Bridgewater, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 247 days.

This patent is subject to a terminal disclaimer.

(21) Appl. No.: 15/072,120

(22) Filed: Mar. 16, 2016

(65) Prior Publication Data

US 2017/0272319 A1 Sep. 21, 2017

(51) Int. Cl.
*H04L 12/24* (2006.01)
*H04W 24/10* (2009.01)

(52) U.S. Cl.
CPC ......... *H04L 41/0816* (2013.01); *H04W 24/10* (2013.01)

(58) Field of Classification Search
CPC .... H04W 24/10; H04L 43/08; H04L 41/0631; H04L 41/5035; H04L 43/0876; H04L 41/5067; H04L 41/5009
See application file for complete search history.

(56) References Cited

U.S. PATENT DOCUMENTS

| | | | |
|---|---|---|---|
| 9,071,677 B2 * | 6/2015 | Aggarwal | H04M 3/2227 |
| 9,130,860 B1 | 9/2015 | Boe et al. | |
| 2007/0225835 A1 * | 9/2007 | Zhu | G05B 13/042 |
| | | | 700/44 |
| 2012/0266094 A1 * | 10/2012 | Starr | H04L 41/22 |
| | | | 715/771 |
| 2013/0272150 A1 * | 10/2013 | Wan | H04L 43/08 |
| | | | 370/252 |

(Continued)

FOREIGN PATENT DOCUMENTS

| CN | 102104901 A | 6/2011 |
|---|---|---|
| CN | 102149119 A | 8/2011 |

(Continued)

*Primary Examiner* — Hitesh Patel
*Assistant Examiner* — Eui H Kim
(74) *Attorney, Agent, or Firm* — Slater Matsil, LLP

(57) ABSTRACT

Embodiments of this disclosure filter a set of key performance indicators (KPIs) based on various criteria to reduce the number of root causes that are considered when adjusting the wireless configuration parameters. In particular, the set of KPIs may be filtered based on various criteria. In one example, KPIs having a hit-ratio below a hit-ratio threshold are removed from the set of KPIs. In another example, KPIs having a slope of linear regression below a threshold slope are removed from the set of KPIs. In yet another example, a KPI is removed from the set of KPIs when a causal relationship between the KPI and another KPI in the set of KPIs exceeds a threshold. In yet another example, a KPI is removed from the set of KPIs when the KPI has a prediction impact score that fails to exceed a prediction impact threshold.

17 Claims, 15 Drawing Sheets

(56) References Cited

U.S. PATENT DOCUMENTS

| | | | |
|---|---|---|---|
| 2014/0222996 A1* | 8/2014 | Vasseur | H04L 41/16 709/224 |
| 2014/0222998 A1* | 8/2014 | Vasseur | H04L 41/16 709/224 |
| 2014/0337871 A1 | 11/2014 | Garcia De Blas et al. | |
| 2015/0119020 A1 | 4/2015 | Henderson et al. | |
| 2015/0199136 A1* | 7/2015 | Faulkner | G06F 3/0611 711/114 |
| 2015/0281004 A1 | 10/2015 | Kakadia et al. | |
| 2015/0304191 A1* | 10/2015 | Groenendijk | H04L 41/5032 370/252 |
| 2015/0325017 A1* | 11/2015 | Fletcher | G06T 11/206 345/440 |
| 2015/0347953 A1 | 12/2015 | Saito et al. | |
| 2016/0105330 A1 | 4/2016 | Choudhary et al. | |
| 2016/0112894 A1* | 4/2016 | Lau | H04W 24/10 370/252 |
| 2016/0157114 A1 | 6/2016 | Kalderen et al. | |
| 2016/0162346 A1 | 6/2016 | Kushnir et al. | |
| 2016/0189079 A1* | 6/2016 | Gajdzinski | G06Q 10/06393 705/7.37 |
| 2016/0292611 A1 | 10/2016 | Boe et al. | |
| 2017/0208487 A1 | 7/2017 | Ratakonda et al. | |
| 2017/0262781 A1 | 9/2017 | Yang et al. | |
| 2018/0006957 A1 | 1/2018 | Ouyang et al. | |
| 2018/0052912 A1 | 2/2018 | Fletcher et al. | |

FOREIGN PATENT DOCUMENTS

| | | |
|---|---|---|
| CN | 103312531 A | 9/2013 |
| CN | 105050125 A | 11/2015 |
| WO | 2017157171 A1 | 9/2017 |

\* cited by examiner

SYSTEMS AND METHODS FOR IDENTIFYING CAUSES OF QUALITY DEGRADATION IN WIRELESS NETWORKS

TECHNICAL FIELD

The present invention relates generally to wireless communications, and, in particular embodiments, to systems and methods for identifying causes of quality degradation in wireless networks.

BACKGROUND

Network operators monitor wireless networks to identify quality of service or quality of experience problems. For complex cases, network operators may retain a subject matter expert to analyze network diagnostic information and adjust wireless network parameters to identify and troubleshoot the underlying quality of service problem. Subject matter experts are not always readily available, and their results vary based on the skill and experience of the individual retained. Accordingly, autonomous techniques for diagnosing and resolving quality of service problems in wireless networks are desired.

SUMMARY OF THE INVENTION

Technical advantages are generally achieved, by embodiments of this disclosure which describe systems and methods for identifying causes of quality degradation in wireless networks.

In accordance with an embodiment, a method for adjusting configuration parameters in a wireless network is provided. In this example, the method includes receiving a key quality indicator (KQI) and a set of key performance indicators (KPIs) associated with wireless transmissions in a wireless network area during a first period, removing, from the set of KPIs, one or more KPIs that fail to satisfy a criteria, and adjusting configuration parameters of the wireless network area in accordance with relationships between the KQI and remaining KPIs in the set of KPIs. The adjusted configuration parameters being used to operate the wireless network during a second period. An apparatus and computer program product for performing the method are also provided.

In accordance with another embodiment, yet another method for adjusting configuration parameters in a wireless network is provided. In this example, the method includes receiving a key quality indicator (KQI) and a set of key performance indicators (KPIs) associated with wireless transmissions in a wireless network area during a first period, removing, from the set of KPIs, KPIs having a hit-ratio below a hit-ratio threshold to obtain a first subset of KPIs, removing, from the first subset of KPIs, KPIs having a slope of linear regression below a threshold slope to obtain a second subset of KPIs. The method further includes removing, from the second subset of KPIs, KPIs that are below a global threshold to obtain a third subset of KPIs, removing, from the third subset of KPIs, KPIs that satisfy a causality criteria, a prediction criteria, or both, to obtain a fourth subset of KPIs, and adjusting configuration parameters of the wireless network in accordance with relationships between the KQI and remaining KPIs in the fourth subset of KPIs, the adjusted configuration parameters being used to operate the wireless network area during a second period. An apparatus and computer program product for performing the method are also provided.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
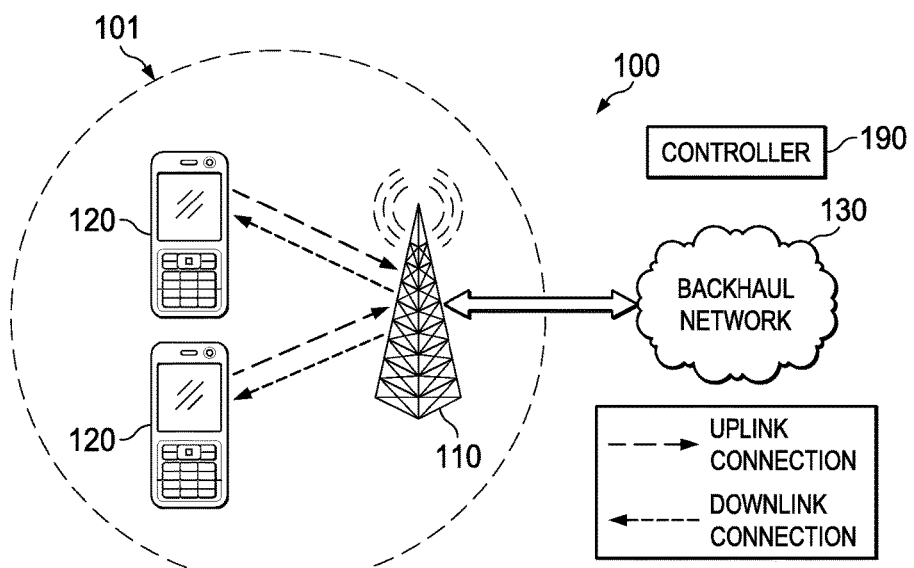
FIG. 1 illustrates a diagram of an embodiment wireless communications network.

The structure, manufacture and use of embodiments are discussed in detail below. It should be appreciated, however, that this disclosure provides many applicable inventive concepts that can be embodied in a wide variety of specific contexts. The specific embodiments discussed herein are merely illustrative of specific examples of the inventive aspects, and do not limit the scope of the claims.

Aspects of this disclosure leverage data analytics to identify relationships between a quality indicator (e.g., packet loss rates, etc.) and performance indicators (e.g., interference, reference signal received power (RSRP), etc.)

to determine the degree to which a worsening in a performance metric causes a degradation in the quality of service (QoS) provided to network subscribers.

Techniques for adjusting configuration parameters of a wireless network based on relationships between key quality indicators (KQIs) and key performance indicators (KPIs) obtained from the wireless network are described in U.S. Non-Provisional patent application Ser. No. 15/072,025 entitled "Systems and Methods for Robustly Determining Time Series Relationships in Wireless Networks," which is hereby incorporated by reference herein as if reproduced in its entirety. A KQI may be any metric that is used to gauge the quality of service/experience collectively observed by users/devices when communicating a particular type of traffic in a wireless network or wireless network area. A KPI may be any specific performance metric of a wireless network tending to have a causal or correlative relationship with a KQI.

As described in the U.S. Non-Provisional patent application Ser. No. 15/072,025, some embodiment optimization techniques evaluate relationships between a KQI and a set of KPIs. Embodiments of this disclosure filter the set of KPIs based on various criteria to reduce the number of root causes that are considered when adjusting the wireless configuration parameters. In particular, the set of KPIs may be filtered based on various criteria, including hit-ratios, slopes of linear regression, global thresholds, causal relationships between KPIs, and prediction impact scores. In one example, KPIs having a hit-ratio below a hit-ratio threshold are removed from the set of KPIs. In such an example, the KQI and KPI may specify quality and performance measurement values (respectively) for a set of discrete time intervals during the initial period, and the hit-ratio may indicate a ratio of a number of discrete time intervals in which both a value of the KQI exceeds a quality threshold and a value of a corresponding KPI in the set of KPIs exceeds a corresponding performance threshold to a total number of instances in which the value of the KQI exceeds the quality threshold. In another example, KPIs having a slope of linear regression below a threshold slope are removed from the set of KPIs. A slope of linear regression may indicate a degree in which a change in a value of the KQI is attributable to a change in a value of a corresponding KPI in the set of KPIs. In yet another example, KPIs that fail to exceed a global performance threshold are removed from the set of KPIs. In yet another example, a KPI is removed from the set of KPIs when a causal relationship between the KPI and another KPI in the set of KPIs exceeds a threshold. A casual relationship indicates the degree to which a change in a value of one KPI impacts a value of another KPI. In yet another example, the controller 190 removes KPIs that fail to exceed a global performance threshold. In yet another example, a KPI is removed from the set of KPIs when the KPI has a prediction impact score that fails to exceed a prediction impact threshold. A prediction impact score indicates the impact a given KPI has on prediction accuracy of the KQI. These and other aspects are discussed in greater detail below.

FIG. 1 is a diagram of a wireless network 100 for communicating data. The wireless network 100 includes a base station 110 having a wireless coverage area 101, a plurality of mobile devices 120, a backhaul network 130, and a controller 190. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an evolved NodeB (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac. As used herein, the term "mobile device" refers to any component (or collection of components) capable of establishing a wireless connection with a base station, such as a user equipment (UE), a mobile station (STA), relay, device engaging in machine type communications, or other wirelessly enabled devices. The controller 190 may be any component, or collection of components, adapted to perform network optimization for the wireless coverage area 101. The controller 190 may be co-located with the base station 110. Alternatively, the controller 190 may be separate and distinct from the base station 110, in which case the controller 190 may communicate with the base station over the backhaul network 130. In some embodiments, the network 100 may comprise various other wireless devices, such as low power nodes, etc.

Optimization techniques may adjust configuration parameters of a wireless network based on relationships between a KQI and a set of KPIs. Aspects of this disclosure filter the set of KPIs based on various criteria, including hit-ratios, slopes of linear regression, global thresholds, causal relationships between KPIs, and prediction impact scores. In one example, the controller 190 receives a KQI and a set of KPIs from the base station 110 that were associated with wireless transmissions in the wireless coverage area 101 during an initial period. An initial period may be a period of time in which KQI and/or KPIs are monitored in one or more wireless coverage areas of a wireless network. The controller 190 then removes, from the set of KPIs, one or more of the KPIs that fail to satisfy a criteria. In one example, the controller 190 removes KPIs having a hit-ratio below a hit-ratio threshold. In such an example, the KQI and KPI may specify quality and performance measurement values (respectively) for a set of discrete time intervals during the initial period, and the hit-ratio may indicate a ratio of a number of discrete time intervals in which both a value of the KQI exceeds a quality threshold and a value of a corresponding KPI in the set of KPIs exceeds a corresponding performance threshold to a total number of instances in which the value of the KQI exceeds the quality threshold. In another example, the controller 190 removes KPIs having a slope of linear regression below a threshold slope. A slope of linear regression may indicate a degree in which a change in a value of the KQI is attributable to a change in a value of a corresponding KPI in the set of KPIs. In yet another example, the controller 190 removes KPIs that fail to exceed a global performance threshold. In yet another example, the controller 190 removes KPIs when a causal relationship between the KPI and another KPI satisfies a defined criteria. A casual relationship indicates the degree to which a change in a value of one KPI is impacts a value of another KPI. In yet another example, the controller 190 removes KPIs having a prediction impact score that fails to exceed a prediction impact threshold. A prediction impact score indicates the impact a given KPI has on prediction accuracy of the KQI.

Thereafter, the controller 190 adjusts a configuration parameter of the wireless coverage area 101 based on relationships between the KQI and remaining KPIs in the set of KPIs. The adjusted configuration parameters are used to communicate transmissions in the wireless network area 101 during a subsequent period. The KQI and/or KPIs may or may not be monitored during the subsequent period. The subsequent period and the initial period may be the same length time periods, or different length time periods.

Figure 2:
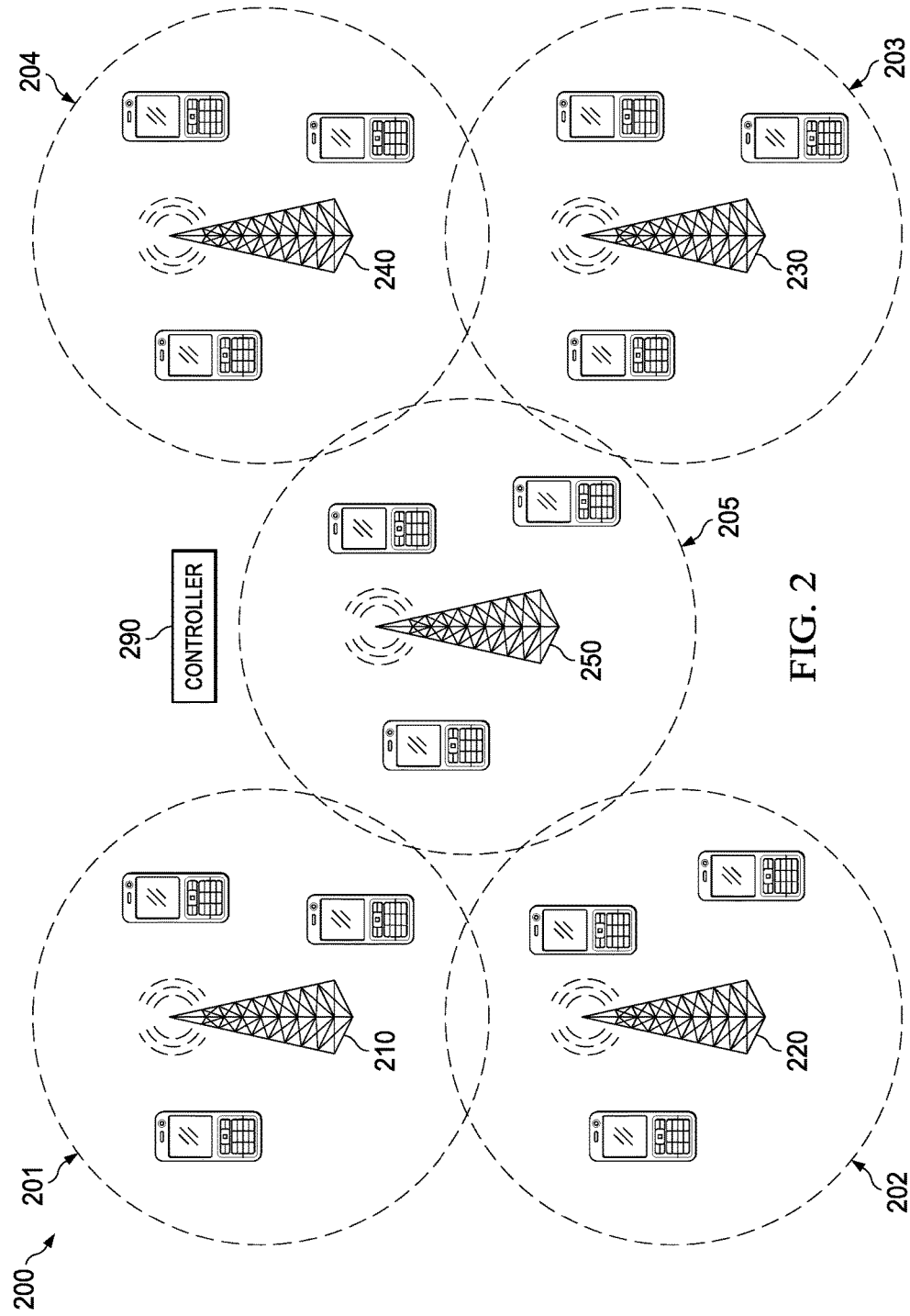
FIG. 2 illustrates a diagram of an embodiment wireless communications network that includes multiple coverage areas.

In some embodiments, network optimization is performed for a cluster of wireless coverage areas in a wireless network. FIG. 2 illustrates a wireless network 200 comprising wireless coverage areas 201, 202, 203, 204, 205 within which wireless access is provided to mobile devices by base stations 210, 220, 230, 240, 250 (respectively). A KQI in one wireless coverage area may be affected by configuration parameters in one or more neighboring wireless coverage areas. Accordingly, the base stations 210, 220, 230, 240, 250 may report KQIs and KPIs to the controller 290. The controller 290 may determine relationships between the KQIs and KPIs, and then adjust configuration parameters of the wireless coverage areas 201, 202, 203, 204, 205 accordingly.

Optimization techniques may adjust configuration parameters of a wireless network based on relationships between a KQI and a set of KPIs. Aspects of this disclosure further filter the subset of KPIs based on a criteria. In an embodiment, the controller 290 receives a set of KQIs and a set of KPIs associated with wireless transmissions in each of the wireless coverage areas 201, 202, 203, 204, 205, and then filters at least one set of KPIs based on a selection criteria. In one example, the controller 290 removes one or more KPIs from a set of KPIs associated with the wireless network area 205 based on global performance thresholds. The global performance thresholds may be computed based on the KPIs associated with of the two or more of the wireless coverage areas 201, 202, 203, 204, 205.

Various KPIs may be monitored for different types of KQIs. Table 1 identifies examples of KPIs that may be monitored for packet loss key quality indicator.

wireless network, as might be performed by a controller. At step 310, the controller receives a KQI and a set of KPIs associated with wireless transmissions in a wireless network area during a first period. At step 320, the controller removes, from the set of KPIs, KPIs that fail to satisfy a criteria. At step 330, the controller adjusts configuration parameters of the wireless network in accordance with relationships between the KQI and remaining KPIs in the set of KPIs. Pruning KPIs from the set of KPIs may generally reduce the number of KPIs that are used to adjust parameters in the wireless network. In some embodiments, KPIs are removed based on how strong the relationship is between the KPI and the KQI. In one example, KPIs are removed from the set when a hit-ratio between the KQI and the corresponding KPI fails to exceed a threshold. This may tend to prune a KPI when there is a low correlation between instances in which the KPI exhibits a high value and instances in which the KQI exhibits a high value. In another example, KPIs are removed from the set when a slope of linear regression between the KPI and the KQI fails to exceed a threshold. This may tend to prune a KPI when a change in the KPI is deemed to have a relatively small affect in the value of the KQI. In other embodiments, a KPI associated with a local wireless coverage area in multi-cell network may be pruned when the value of the KPI does not exceed a global threshold. The global threshold may be based on the value of the KPI in other local wireless coverage areas, e.g., one standard deviation, two standard deviations, top ten percent, etc. This may prune KPIs that exhibit values that are within an expected range based on like KPIs with the global wireless network.

Figure 4:
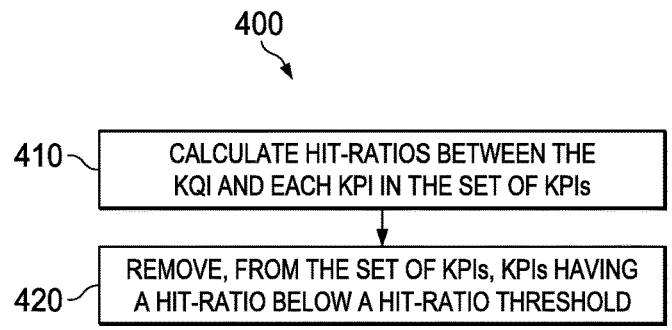
FIG. 4 illustrates a flowchart of an embodiment method for pruning KPIs based on hit-ratios.

Various techniques are available for pruning KPIs. KPIs may be pruned based on hit-ratios. FIG. 4 illustrates a flowchart of an embodiment method 400 for pruning KPIs based on hit-ratios, as might be performed by a controller. At step 410, the controller calculates hit-ratios between a KQI and each KPI in a set of KPIs. The hit-ratio for a given KPI may be the ratio of discrete time intervals in which both a value of the KQI exceeds a quality threshold and a value of a corresponding KPI in the set of KPIs exceeds a corre-

TABLE 1

| KPI | Description |
| --- | --- |
| Avg.PUSCH.Inteference | Average physical uplink shared channel interference |
| Avg.PUCCH.Inteference | Average physical uplink control channel interference |
| Avg.PUCCH.Rsrp | Average physical uplink control channel RSRP |
| Avg.PUSCH.Rsrp | Average physical uplink shared channel RSRP |
| DL.PDSCH.DTX.Rate | Downlink physical share channel discontinuous transmission rate |
| UL.CCE.Alloc.Fail.Rate | Uplink control channel element allocation failure rate |
| DL.CCE.Alloc.Fail.Rate | Downlink control channel element allocation failure rate |
| DMRS.Scheduling.Num | Number of times demodulation reference signal scheduled |
| Sleep.TTI.Rate | Transmission Time Interval in sleep state rate |
| DMRS.Scheduling.Rate | Demodulation reference signal scheduled Rate |
| Intra.eNB.Intra.Freq.HO | Intra-eNodeB intra-frequency handover |
| Intra.eNB.Inter.Freq.HO | Intra-eNodeB inter-frequency handover |
| Inter.eNB.Intra.Freq.HO | Inter-eNodeB intra-frequency handover |
| Inter.eNB.Inter.Freq.HO | Inter-eNodeB inter-frequency handover |
| Intra.eNB.Inter.FDDTDD.HO | Intra-eNodeB inter-FDD or inter-TDD handover |
| Inter.eNB.Inter.FDDTDD.HO | Inter-eNodeB inter-FDD or inter-TDD handover |
| UL.CCE.Use.Rate | Uplink control channel element usage rate |
| DL.CCE.Use.Rate | Downlink control channel element usage rate |
| CCE.Use.Rate | Control channel element usage rate |
| DL.SRB.CCE.Use.Rate | Downlink signaling radio bearer control channel element usage rate |

Figure 3:
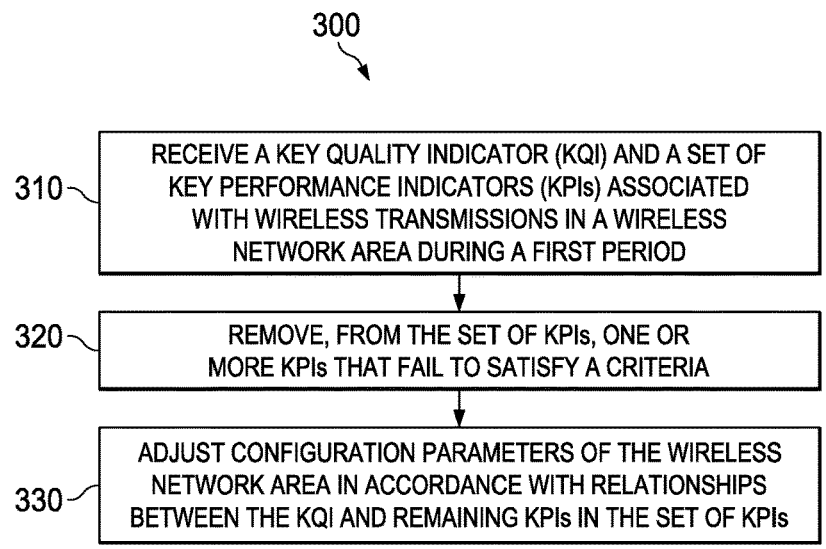
FIG. 3 illustrates a flowchart of an embodiment method for adjusting configuration parameters in a wireless network.

Aspects of this disclosure provide techniques for pruning the set of KPIs that are used to determine wireless parameter adjustment. FIG. 3 illustrates a flowchart of an embodiment method 300 for adjusting configuration parameters in a sponding performance threshold to a total number of instances in which the value of the KQI exceeds the quality threshold. As an illustrative example, if a KPI exceeds the quality threshold for ten discrete time intervals, and a given KPI exceeds the performance threshold for seven of those ten discrete time intervals, then the hit-ratio for the given KPI may be 7:10. At step 420, the controller removes, from the set of KPIs, any KPI that has a hit-ratio below a hit-ratio threshold. In one example, one KPI in a set of KPIs has a hit-ratio of 9:10 and another KPI in the set of KPIs has a hit-ratio of 7:10. If the hit-ratio threshold is 8:10, then the KPI having the hit-ratio of 7:10 is pruned from set, while the KPI having a hit-ratio of 9:10 remains in the set.

Figure 5:
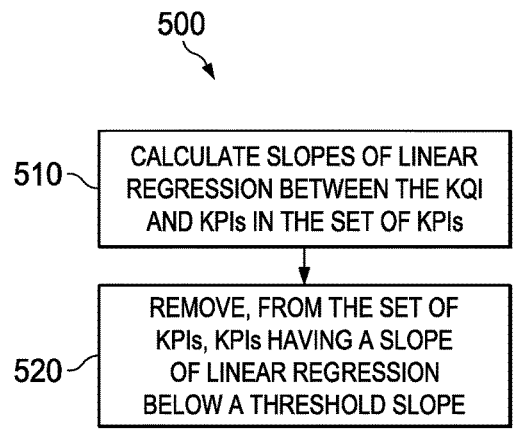
FIG. 5 illustrates a flowchart of an embodiment method for pruning KPIs based on slopes of linear regression.

KPIs may also be pruned based on slopes of linear regression. FIG. 5 illustrates a flowchart of an embodiment method 500 for pruning KPIs based on slopes of linear regression, as might be performed by a controller. At step 510, the controller calculates slopes of linear regression between the KQI and KPIs in the set of KPIs. At step 520, the controller removes, from the set of KPIs, any KPI that has a slope of linear regression below a threshold slope.

Figure 6:
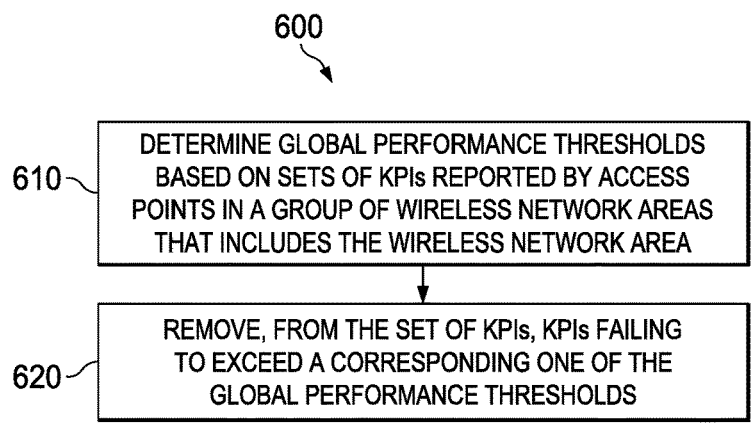
FIG. 6 illustrates a flowchart of an embodiment method for pruning KPIs based on global performance thresholds.

KPIs may also be pruned based on global performance thresholds. FIG. 6 illustrates a flowchart of another embodiment method 600 for pruning KPIs based on global performance thresholds, as might be performed by a controller. At step 610, the controller determines global performance thresholds based on sets of KPIs reported by access points in a group of wireless network areas that includes the wireless network area. The global performance thresholds may be a statistical threshold, such as an upper percentage (e.g., top 20%, top 15%, top 10%, top 5%, etc.) or standard deviation (e.g., greater than one standard deviation, greater than two standard deviations, etc.). At step 620, the controller removes, from the set of KPIs, any KPI that has a value which fails to exceed a corresponding one of the global performance thresholds. For example, in the context of uplink packet loss (for example), a group of access points may report RSRP levels, and KPI values that are less outside the top ten percent of those reported by the access points may be pruned from the set of KPIs.

Figure 7:
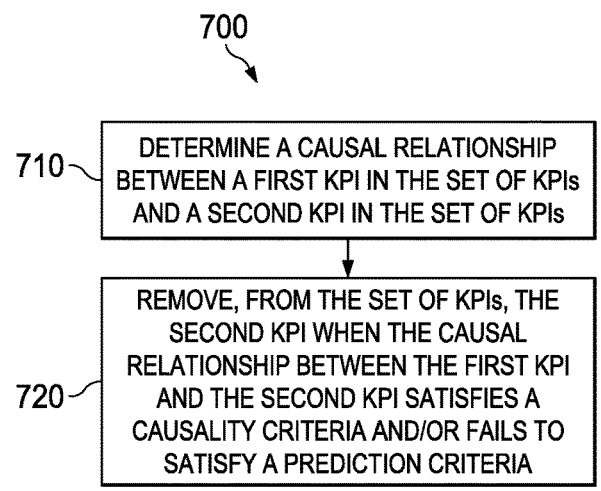
FIG. 7 illustrates a flowchart of an embodiment method for pruning KPIs based on causal relationships between KPIs.

KPIs may also be pruned based on causal relationships between respective KPIs. FIG. 7 illustrates a flowchart of another embodiment method 700 for pruning KPIs based on causal relationships between KPIs, as might be performed by a controller. At step 710, the controller determines a causal relationship between a first KPI in a set of KPIs and a second KPI in the set of KPIs. The casual relationship indicates the degree to which a change in a value of the first KPI impacts a value of the second KPI. For example, in some cases higher Avg.PUSCH.Inteference may cause UL.CCE.Alloc.Fail.Rate to become higher as depicted on FIG. 16, while both of them may appear in the candidate cause list. At step 720, the controller removes, from the set of KPIs, the second KPI when the causal relationship between the first KPI and the second KPI satisfies a causality criteria and/or fails to satisfy a prediction criteria.

Figure 8:
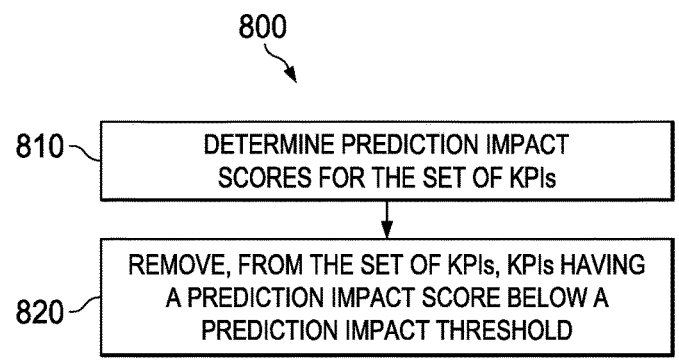
FIG. 8 illustrates a flowchart of an embodiment method for pruning KPIs based on prediction impact scores.

KPIs may also be pruned based on prediction impact scores. In particular, a prediction impact score for a KPI indicates a degree of accuracy (or an impact on the accuracy) in which a value of a corresponding KPI in the set of KPIs can be used to predict a value of the KQI. FIG. 8 illustrates a flowchart of another embodiment method 800 for pruning KPIs based on prediction impact scores, as might be performed by a controller. For example, when 3 KPIs appear on candidate cause list, prediction accuracy for the KQI of using all 3 KPIs can be calculated (after a proper regression model is selected) as the comparison base. The step includes removing the first KPI from the set of KPIs, calculating prediction accuracy using the remaining 2 KPIs, then computing the prediction accuracy difference between this prediction accuracy and the base prediction accuracy. The procedure repeats for each of the KPI in the set of the KPIs. The prediction accuracy difference can be one of the options for prediction impact score associated with the KPI (to the KQI). Higher the prediction impact scores indicate that the KPI has a higher impact in the KQI prediction than KPIs with lower prediction impact scores. When a prediction impact score associated with a KPI (with respect to the KQI) is less than a threshold, it may be considered to be of less importance in predicting the KQI, and thus can be excluded from the subset of KPIs used to adjust configuration parameters. At step 810, the controller determines prediction impact scores for the set of KPIs. At step 820, the controller removes, from the set of KPIs, any KPI that has a prediction impact score that fails to exceed a corresponding prediction impact threshold.

Figure 9:
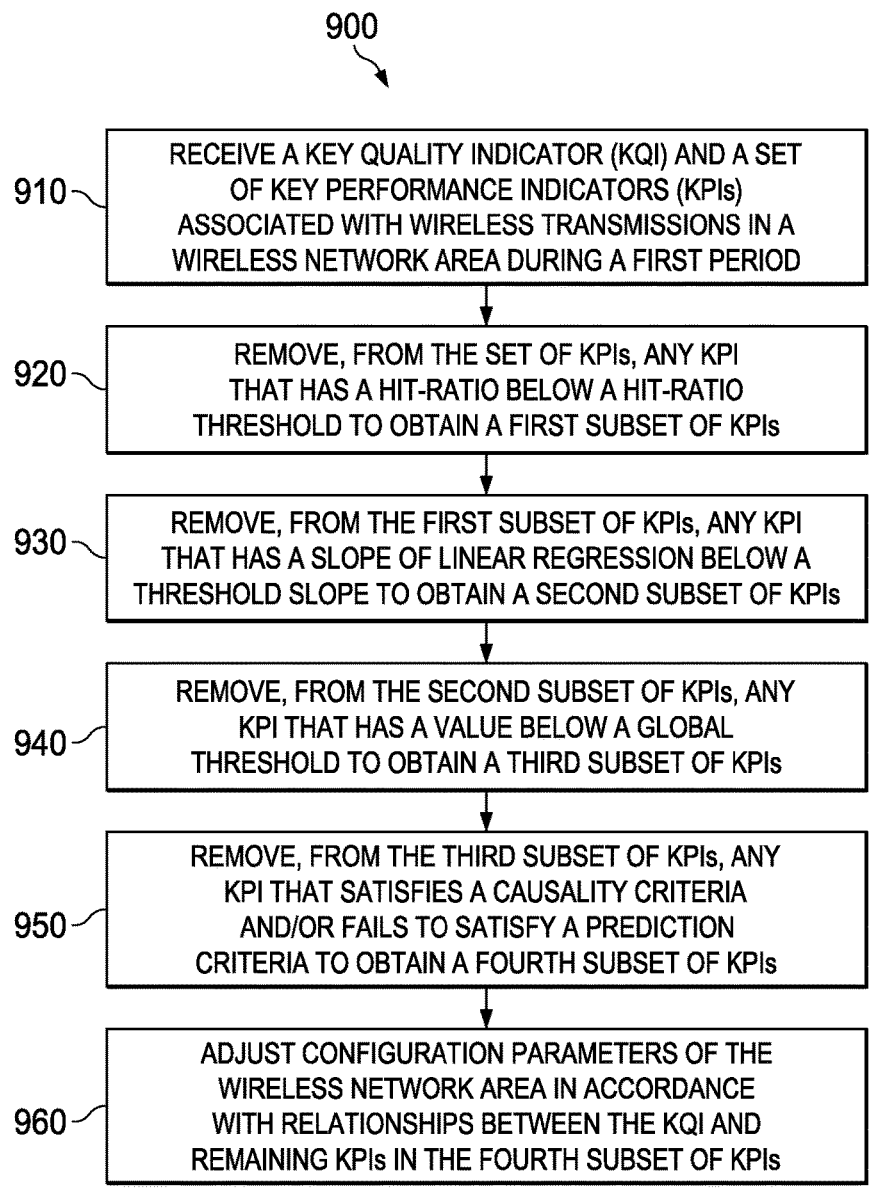
FIG. 9 illustrates a flowchart of another embodiment method for adjusting configuration parameters in a wireless network.

In some embodiments, multiple pruning steps are performed to reduce the size of the set of KPIs before analyzing the set to determine parameter adjustments in a wireless network. FIG. 9 illustrates a flowchart of an embodiment method 900 for adjusting configuration parameters in a wireless network, as might be performed by a controller. At step 910, the controller receives a KQI and a set of KPIs associated with wireless transmissions in a wireless network area during a first period. At step 920, the controller removes, from the set of KPIs, any KPI that has a hit-ratio below a hit-ratio threshold to obtain a first subset of KPIs. At step 930, the controller, removes from the first subset of KPIs, any KPI that has a slope of linear regression below a threshold slope to obtain a second subset of KPIs. At step 940, the controller, removes from the second subset of KPIs, any KPI that has a value below a global threshold to obtain a third subset of KPIs. At step 950, the controller, removes from the third subset of KPIs, any KPI that either satisfies a causality criteria and/or fails to satisfy a prediction criteria to obtain a fourth subset of KPIs. In one example, a given KPI is removed from the third subset when a causal relationship between another KPI and the given KPI satisfies a causality criteria during step 950. In another example, a given KPI is removed from the third subset when the KPI that has a prediction impact score that fails to exceed a corresponding prediction impact threshold. At step 960, the controller adjusts configuration parameters of the wireless network in accordance with relationships between the KQI and remaining KPIs in the fourth subset of KPIs. In some embodiments, one or more of the steps 920-950 may be omitted. The order of the steps 920-950 may be altered, and the criteria in one or more of the steps 920-950 may be changed.

Figure 10:
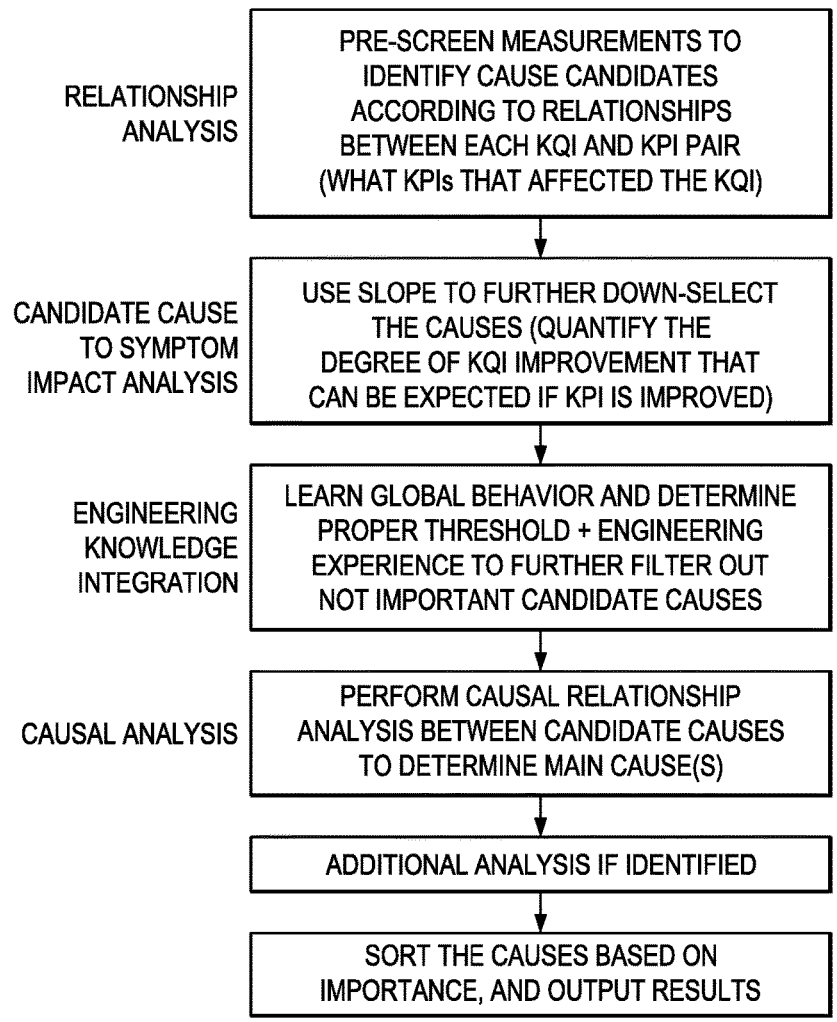
FIG. 10 illustrates a flowchart of an embodiment method for diagnosing quality degradation in a wireless network.

FIG. 10 depicts the flow and steps of an embodiment root cause diagnostics framework. Each step will be further explained in details below.

Step 1: Relationship Analysis and Cause Screening

In this step all the possible causes collected as performance counters are taken into consideration. The relationship between each cause and the identified voice quality degradation indicator, e.g. UL Packet Loss Rate for QCI 1 bearer is evaluated. While this disclosure discusses wireless networks, it should be appreciated that the embodiments are applicable to other communication networks including wired networks, optical networks, or the alike. It should be appreciated that the embodiments are applicable to systems where a relationship between any type of quality indicator and any type of performance indicator are determined, and that the systems may use different names or terminologies to refer to the respective indicators.

A cause is considered to be related to the voice quality degradation (UL Packet Loss Rate for QCI 1 bearer) if its behavior was significantly worse when voice quality degradation occurred. The frequency and its corresponding rate of appearance will be recorded.

A threshold can be used to determine the relevance and filter out those causes which are not considered as relevant to the voice quality degradation.

Figure 11:
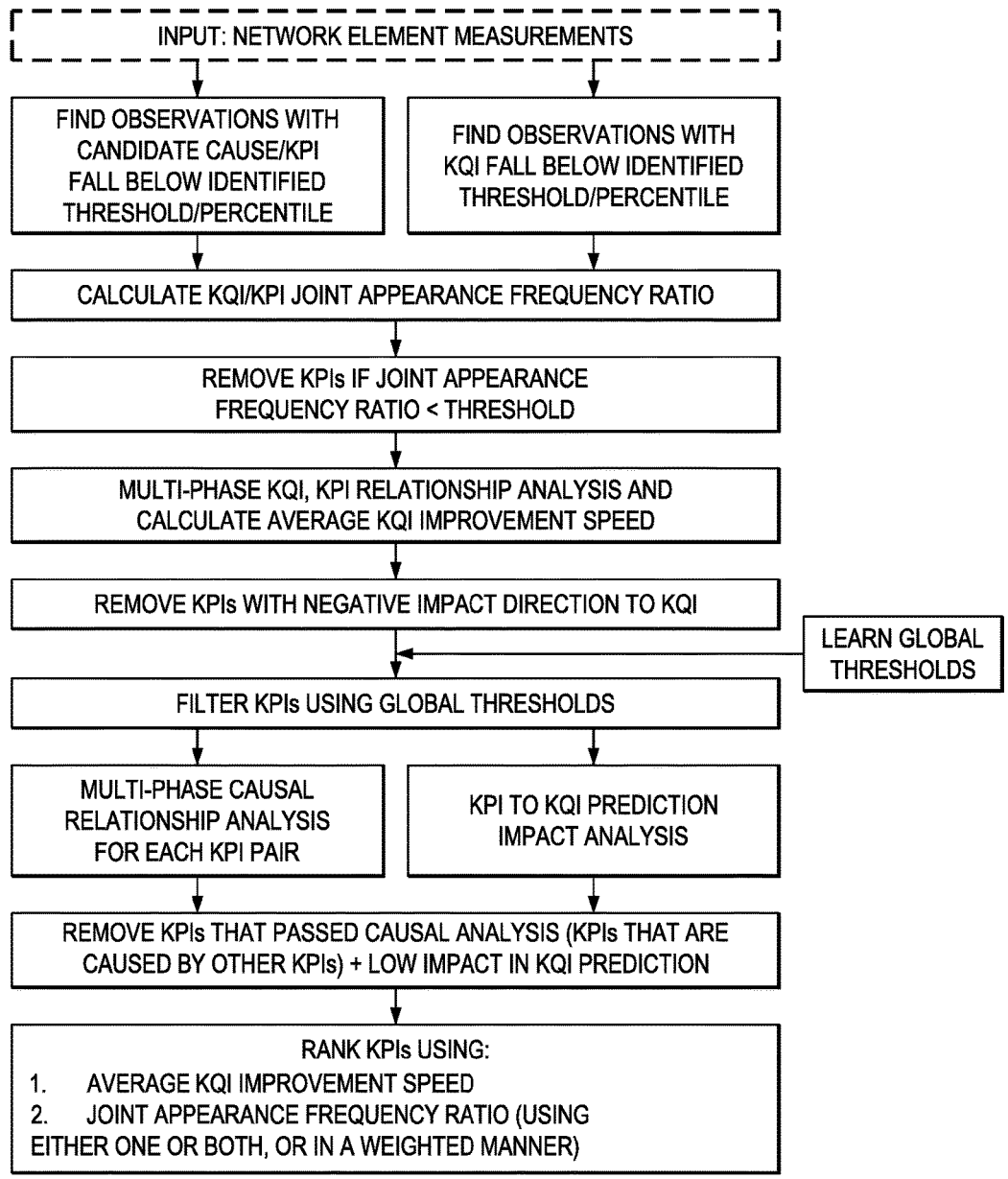
FIG. 11 illustrates a flowchart of another embodiment method for diagnosing quality degradation in a wireless network.

FIG. 11 illustrates a flowchart of another embodiment method for quality degradation diagnostics procedures.

Figure 12:
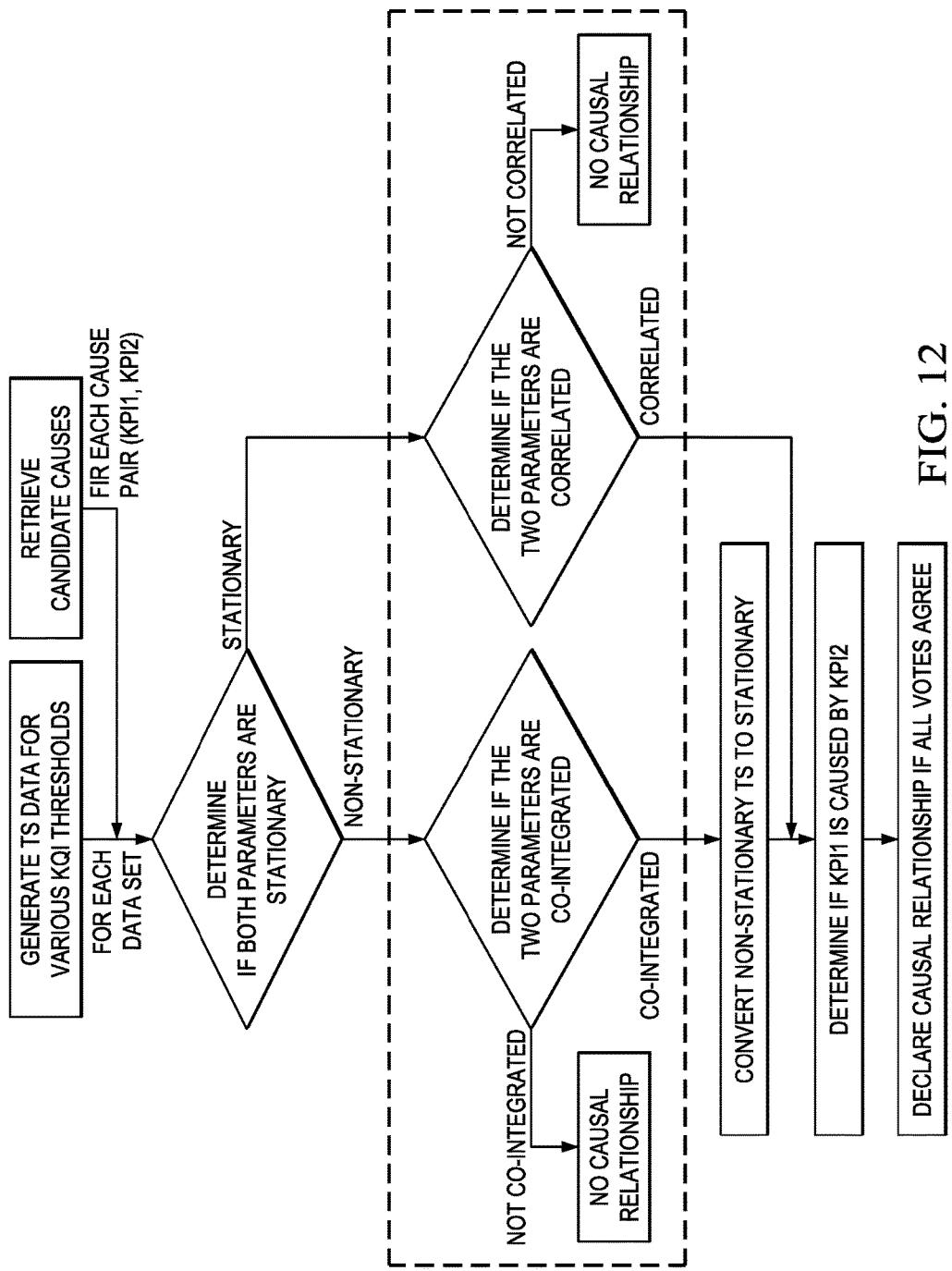
FIG. 12 illustrates a flowchart of yet another embodiment method for diagnosing quality degradation in a wireless network.

FIG. 12 illustrates a flowchart of another embodiment method for quality degradation diagnostics procedures.

Figure 13:
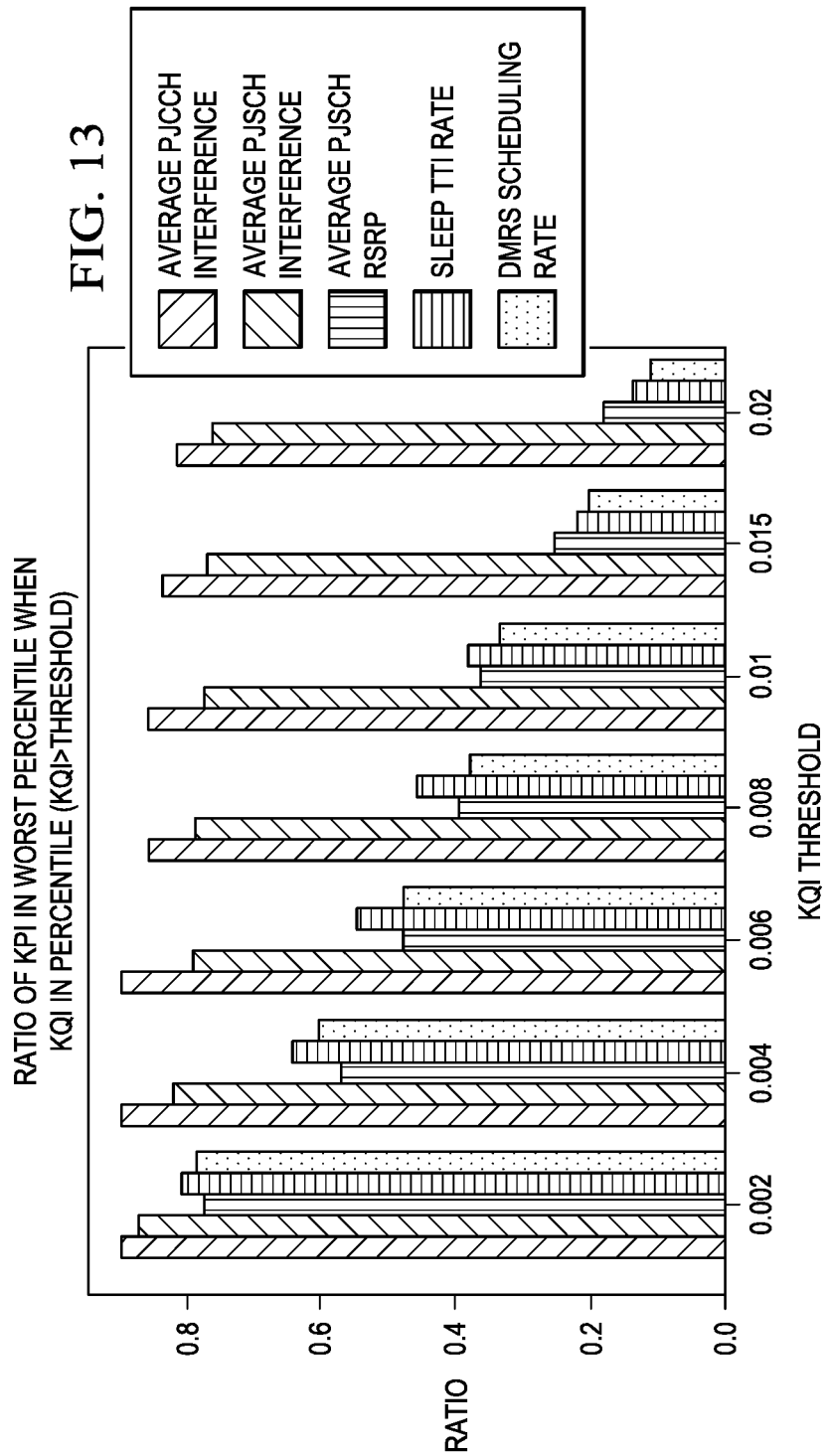
FIG. 13 illustrates a graph of simulation results.

FIG. 13 is an example chart indicating the percent of times each candidate cause's behavior was also worsen when voice quality was degraded and the degradation of Avg.PUCCH.Inteference and Avg.PUSCH.Inteference consistently have very high ratio of presence when KQI was degraded across various thresholds. This suggests that the 2 candidates may be related to the KQI degradation.

Step 2: Candidate Cause to Symptom Impact Analysis

After the cause screening step, most of the not-relevant causes will be filtered out. In this step further examination is taken place by evaluating the behavior relationship between each candidate cause and voice quality degradation indictor at various phases/stages. The purpose of this step is to determine and quantify the impact of each candidate cause to the voice quality degradation indicator when the problem progresses. This will validate the impact contribution for each candidate cause at various phases of degradation and later will be used as ranking criteria in the last step (step 5).

First, the behavior of the voice quality degradation indicator is separated into various phases which can be done either based on engineering judgment, clustering or other mechanisms, e.g. each phase can be defined as KQI above identified threshold. Then, for each phase the relationship between the candidate cause and voice quality degradation indicator is evaluated. To quantify the impact contribution, both the direction (i.e. positive or negative) and degree of changes in the voice quality degradation indicator when the candidate cause gets worse are measured.

The measurements for direction change and its associated degree of changes are collected for all the phases and for all the candidate causes.

The impact contribution for each candidate cause is determined by its corresponding direction change and degree of degradation measurements. Candidate causes with negative direction change, indicating the candidate cause's condition is improving while KQI is deteriorating, or low degree of impact to the voice quality indicator will be considered as non-relevant or low priority causes thus can be filtered out.

Figure 14:
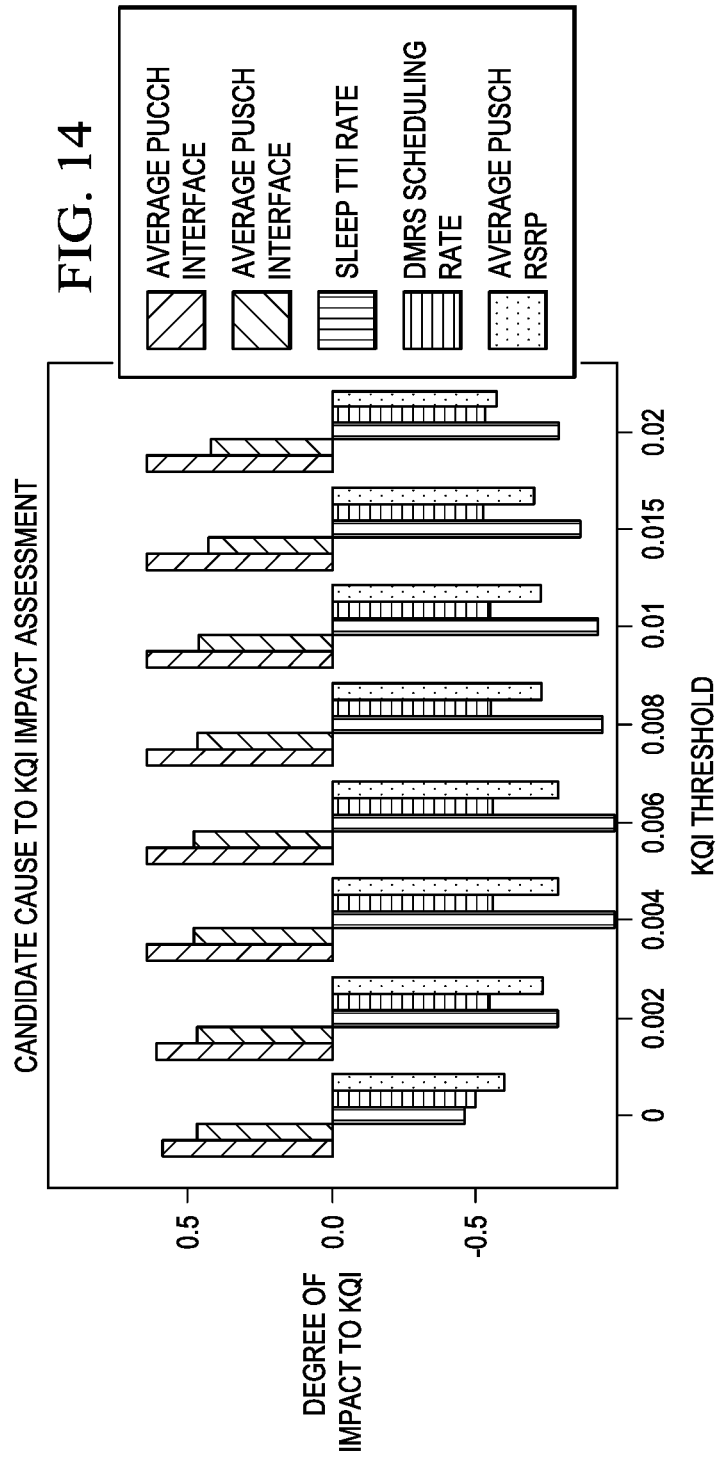
FIG. 14 illustrates another graph of simulation results

FIG. 14 is an example chart from the result of candidate causes to KQI impact assessment. Five candidate causes are evaluated and the result suggested Avg.PUCCH.Inteference and Avg.PUSCH.Inteference have positive impact direction, meaning their condition change direction is consistent with KQI's condition (when they deteriorate KQI also deteriorates) while the other candidate causes have negative impact direction to KQI, indicating these candidates may be irrelevant to KQI's degradation. When looking at the degree of impact to KQI, Avg.PUCCH.Inteference consistently showed the strongest/highest impact to KQI across various KQI degradation phases among all 5 candidate causes, followed by Avg.PUSCH.Inteference.

Step 3: Integration with Engineering Knowledge and Global Thresholds

In the previous step each candidate cause's impact to the voice quality indicator is confirmed, indicating those not being filtered out do show positive impact. In some cases those identified causes may not be severe enough considered by wireless telecommunication network engineers, thus may not require fixes or optimization. As a matter of fact, these causes may even be considered as false alarms by the engineers. This step is designed to further improve the accuracy in root cause diagnostics by the following means:

a. Integrate universal and generic engineering rules into the root cause diagnostics framework. For example, when PUCCH interference is identified as one of the candidate causes but its average value is still under −108 db it will not be considered as root cause. The engineering rules can be provided by experienced network optimization engineers or acquired via other reliable sources.

b. Learn global behavior for the entire market

The identified candidate cause may have higher than average behavior in the network element itself. However when comparing with other network elements in the same market its behavior may be perfectly normal. By marking this cause as root cause would be considered as false alarm. To solve this issue, the proposed diagnostics system will learn the entire market's behavior from all the network elements in it. Based on the distribution of the values, normal vs. higher than average values can be determined. This can be accomplished by using clustering based approach or quantile based approach, or engineering judgment.

When the average value of the identified candidate cause fall within the normal range in the global distribution curve then it would not considered as a root cause, thus will be removed from the candidate list.

Figure 15:
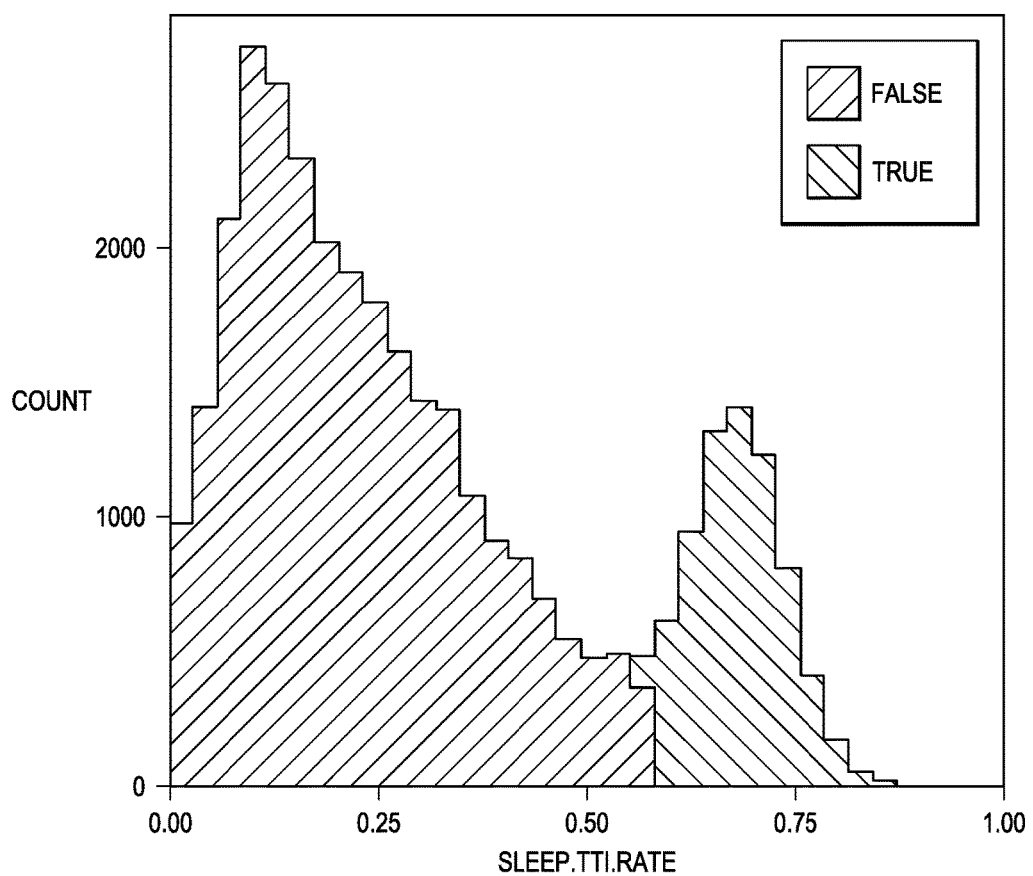
FIG. 15 illustrates yet another graph of simulation results.

FIG. 15 is an example diagram which suggests when Sleep.TTI.Rate value is below or equal to ~0.63 then it will not be considered as high enough to cause UL Packet Loss problem. But if its value is above 0.63 it would be considered as a valid root cause as its value is already above the normal range from the entire market's perspective.

Step 4: Causal Analysis between Candidate Causes

Up till now the above steps focus on analysis of the relationship between candidate causes and the voice quality indicator. One additional factor that needs to be taken into account is the scenario where one or more of the candidate causes may be side effects of the major/main root cause. While their behavior may show positive relationship with the voice quality indicator, fixing these issues alone or optimize the network to improve these measurements alone would not eventually solve the voice quality degradation issue if the main root cause remains there.

This invention also incorporate the causal relationship analysis between each pair of candidate causes into the framework.

Figure 16:
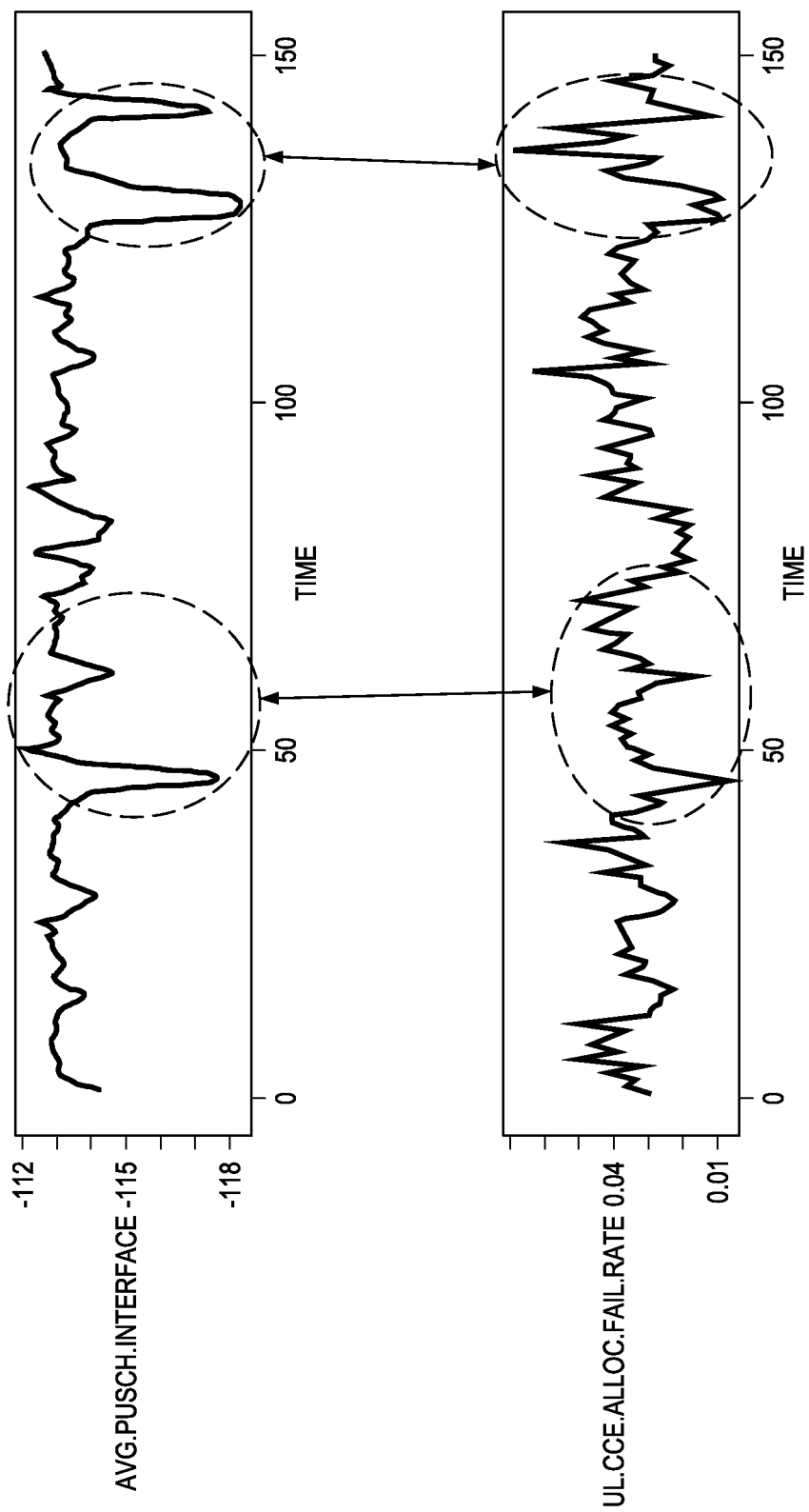
FIG. 16 illustrates yet another graph of simulation results.

After completion of steps 1-3 there may be a few valid candidate causes left to be analyzed. Each possible pair of the causes will then be tested for their potential causal relationship. The causal analysis is performed in both directions. For example if X and Y are both candidate causes then first analyze whether X is caused by Y then analyze if Y is caused by X. When time series X is causing time series Y, those X values will likely provide statistically significant information about future values of Y. FIG. 16 is an example diagram indicating time series variable Avg.PUSCH.Inteference may be the cause for time series variable UL.C-CE.Alloc.Fail.Rate.

As the purpose of this step is to further confirm the identified candidate causes are valid causes for the voice quality degradation issue while none of them is caused by another one in the cause list, a conservative approach is used in the proposed framework to prevent valid root cause(s) being mistakenly removed due to insufficient evidence. Multiple cause analyses are taken and only when the results are all in agreement will the "non-cause" candidate cause be removed from the root cause list. If any of the result suggests an opposite relationship or there is some uncertainty found during the analysis then the candidate cause(s) will stay on the list.

Step 5: Additional Analysis

Other analysis can be performed if identified to further confirm the relationship between KPI and KQI. For example, each candidate cause's prediction power to the KQI behavior can be assessed to make sure candidate causes that can predict KQI behavior very well can be retained in the root cause list.

For example, for multiple KPIs which are candidate causes, the impact on the prediction of KQI by removing one of these KPIs v.s. the prediction of KQI by all these KPIs can be indicated, such as via the difference of the prediction error, or difference of the metric R-square. If after removing a certain KPI, it would have small impact on the KQI prediction, then, the said KPI may be considered to be removed from the root cause list. The small impact can be indicated by, e.g., the difference of the prediction error (removing v.s. not removing the KPI) is smaller than a certain threshold, or the different of the R-square metric (removing v.s. not removing the KPI) is smaller than a certain threshold.

This step can be provided as an option to allow engineers to control the aggressiveness of the algorithm.

This step can be jointly considered with other step(s). In some cases, certain agreement of these steps (such as voting) can apply. For example, if step 4 indicates a certain KPI can be removed, but step 5 indicates this KPI may still have high impact on the KQI prediction, i.e., step 5 suggests not to remove this KPI, then, this KPI can be retained. For another example, if step 4 indicates a certain KPI can be removed, step 5 also indicates this KPI has very low impact in predicting the KQI, then, this KPI can be safely removed. Note that step 5 may be parallel to step 4, and each of these two steps may be after step 3, then the output of step 4 and step 5 are consolidated before going to next step (step 6.)

Step 6: Ranking and Output

After successfully completed steps 1-5 all the candidate causes remain on the list are considered as valid root causes.

One important output component from the proposed root cause diagnostics system is the ranking for each root cause.

The purpose of this step is to provide consolidated measurements for evaluating the importance level of each KQI impacting candidate KPI based on its degree of impact to KQI (can be considered as speed of KQI recovery) and how sensitive KQI reacts to KPI changes.

There are 2 measurements introduced to measure the importance or priority of each candidate cause.

Measurement 1 (Average KQI Improvement Speed):

$$(\Sigma(\delta^{i,KPIj}_{KQI}/\delta^{KQI}_{KPI}))/\text{count}(i), j \in \{KPI_{candidate}\}$$

It represents Average KQI improvement/per unit improvement in KPI (the higher the measurement value the higher the impact to KQI)

Measurement 2 (Sensitivity):

$$(\Sigma(\delta^{KQI}_{i,KPIj}/\delta^{i}_{KQI}))/\text{count}(i), j \in \{KPI_{candidate}\}$$

It represents Average KPI changes/Per unit KQI degradation (the lower the value, the more sensitive this KPI would cause to KQI degradation)

Figure 17:
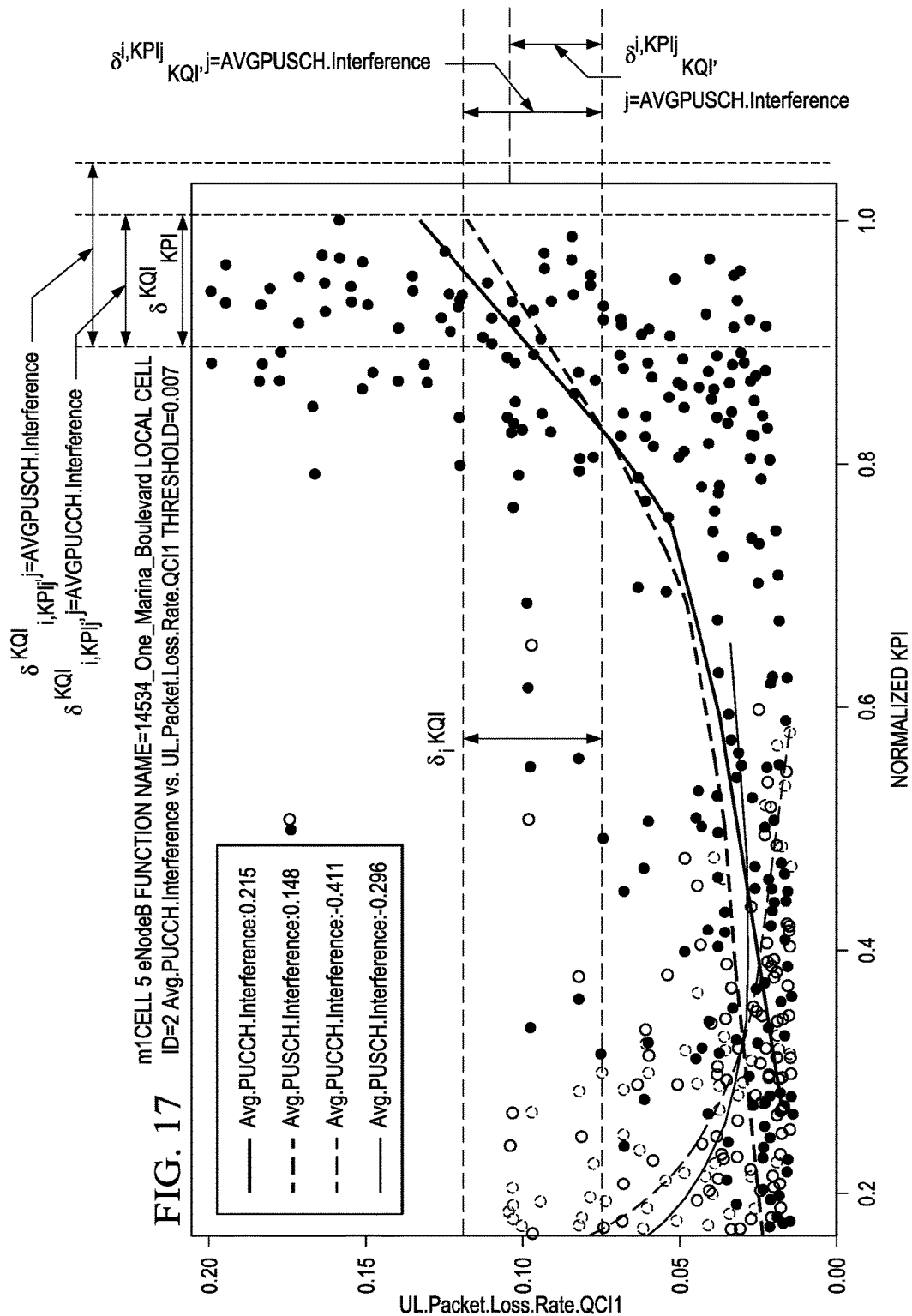
FIG. 17 illustrates yet another graph of simulation results.

The above 2 measurements can be illustrated using the VoLTE voice quality degradation example shown in FIG. 17.

The ranking process is performed as following:

a. The average Degree of Impact to KQI (KQI Improvement Speed) for each candidate cause is calculated across multiple KQI degradation phases In the case of not sufficient samples in some of the phases the average KQI improvement speed can be calculated using only those KQI improvement speed measurements with sufficient samples A variation of the above is to calculate the average KQI improvement speed excluding the highest and lowest measurements to avoid potential impact by noises.

b. The result of the average degree of impact to KQI is sorted in decreasing order and the KPI with the highest degree of impact to KQI is labeled as priority number 1 cause, the KPI with the second highest degree of impact to KQI is labeled as priority number 2 cause, etc.

Figure 18:
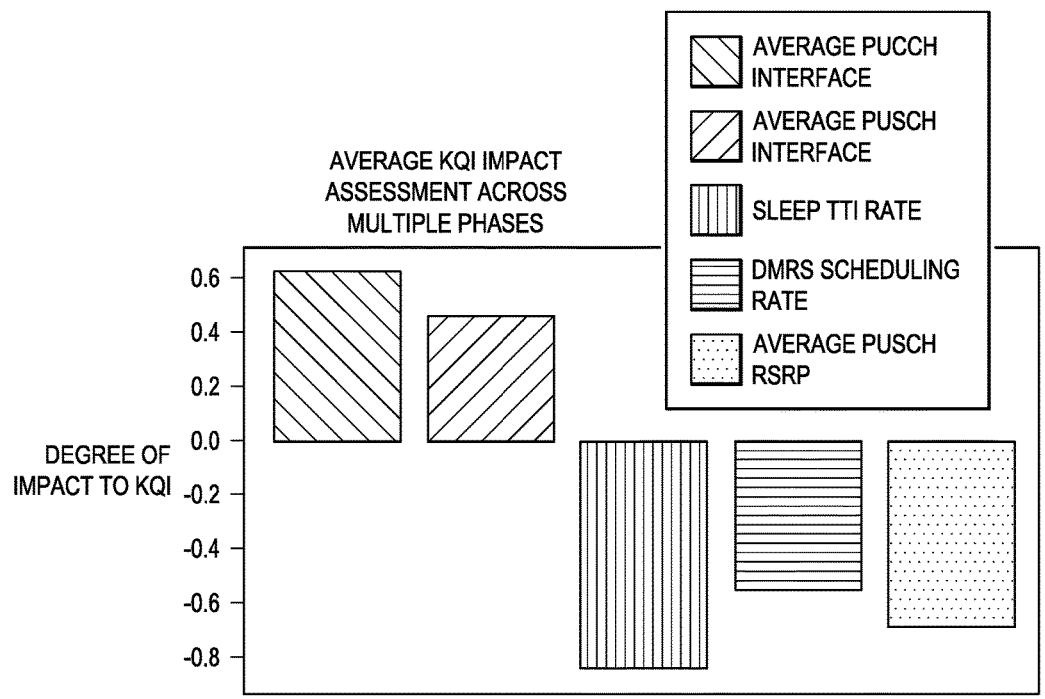
FIG. 18 illustrates yet another graph of simulation results.

FIG. 18 is one example chart of the average Degree of Impact to KQI (KQI Improvement Speed) for the candidate causes left from Steps 1-5. The average KQI Improvement Speed indicates Avg.PUCCH.Inteference is the most important root cause (priority number 1 cause) followed by Avg.PUSCH.Inteference (priority number 2 cause).

The priority ranking for root causes provides important information for the network performance optimization engineers. They can determine which problem should be fixed first based on the KQI Improvement Speed measurement. The higher the KQI Improvement Speed the faster KQI recovery will be achieved.

Another alternative ranking criteria can be based on:

a. Percent of times the behavior of the root cause was significantly worse (than normal) when voice quality degradation occurred. This is one of the metrics tracked by step 1.

b. Average Degree of impact to the voice quality indicator and contribution consistency across various phases as calculated in step 2.

The causes can be ranked by criteria a first followed by criteria b if multiple causes have similar value for the first metric, or ranked by criteria b first followed by criteria a if multiple causes have similar average degree impact to the KQI.

Alternatively, a joint by weight approach can be used which will give a weight factor to criteria a and criteria b separately and the weight factors can be determined based on market condition and operator preference.

Figure 19:
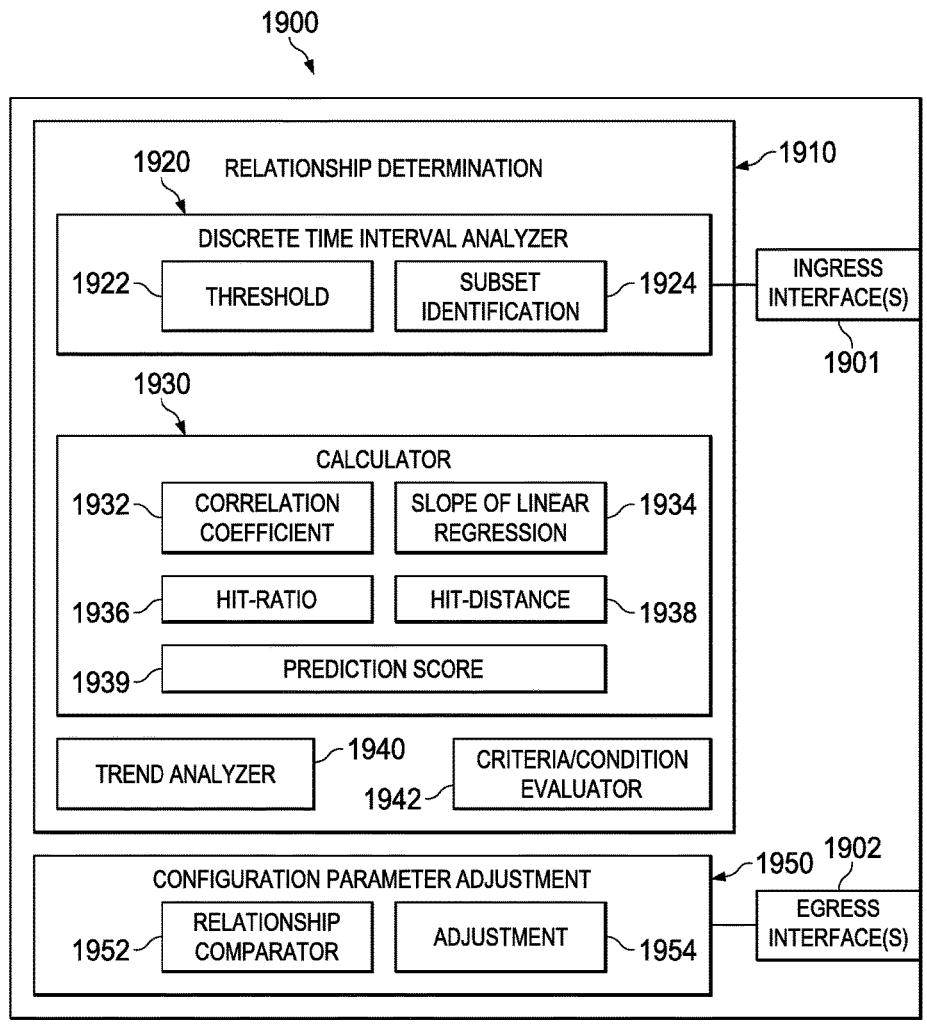
FIG. 19 illustrates a diagram of an embodiment controller adapted to adjust wireless configuration parameters in a wireless network based on relationships between a KQI and KPIs.

FIG. 19 illustrates a block diagram of an embodiment controller 1900 adapted to adjust wireless configuration parameters in a wireless network based on relationships between a KQI and KPIs. As shown, the embodiment controller 1900 includes one or more ingress interfaces 1901, one or more egress interfaces 1902, a relationship determination unit 1910, and a configuration parameter adjustment unit 1950. The one or more ingress interfaces 1901 may be configured to receive information (e.g., measurement reports, etc.) from devices (e.g., APs) in a wireless network. The relationship determination unit 1910 may include hardware and/or software adapted to determine relationships between a KQI and KPIs based on information received over the one or more ingress interfaces 1901. In this example, the relationship determination unit 1910 includes a discrete time interval analyzer 1920, a calculator 1930, a trend analyzer 1940, and a criteria/condition evaluator 1942. The discrete time interval analyzer 1920 includes a threshold setting unit 1922 and a subset identification unit 1924. The threshold setting unit 1922 may include hardware and/or software adapted to analyze KQI and KPI values and set KQI and KPI thresholds. The subset identification unit 1924 may identify subsets of discrete time intervals in which a KPI and/or KPIs satisfy respective KQI and KPI thresholds. The calculator 1930 includes a correlation coefficient calculation unit 1932, a slope of linear regression calculation unit 1934, a hit ratio calculation unit 1936, a hit distance calculation unit 1938, and a prediction score calculation unit 1939. The correlation coefficient calculation unit 1932 may include hardware and/or software adapted to calculate correlation coefficient between a KQI and KQIs during a subset of discrete time thresholds. The slope of linear regression calculation unit 1934 may include hardware and/or software adapted to calculate correlation slopes of linear regression between a KQI and KPIs during subsets of discrete time intervals. The hit ratio calculation unit 1936 and the hit distance calculation unit 1938 may include hardware and/or software for calculating hit-ratios and hit distances (respectively) between a KQI and KPIs during subsets of discrete time intervals. The prediction score calculation unit 1939 may include hardware and/or software for calculating predictions scores between a KQI and KPIs during subsets of discrete time intervals. The trend analyzer 1940 may include hardware and/or software for determining trends between relationships over different subsets of discrete time intervals. The criteria/condition evaluator 1942 may include hardware and/or software for determining whether one or more of the values (e.g. correlation coefficient, slope of linear regression, hit-ratio, hit-distance, prediction score, etc.) generated by the calculator 1930 and/or one or more of the relationships (e.g. causality relationship between 2 KPIs) determined by the trend analyzer satisfies, or fails to satisfy, a criteria or condition.

The configuration parameter adjustment unit 1950 may include a relationship comparator 1952 and an adjustment unit 1954. The relationship comparator 1952 may include hardware and/or software for comparing the relationships between a KQI and different KPIs. The relationship comparator 1952 may be configured to rank KPIs based on the strength of their relationship with a KQI. The adjustment unit 1954 may include hardware and/or software for adjusting wireless configuration parameters based on relationships between a KQI and KPIs, as well as comparison results between said relationships provided by the relationship comparator 1952. As mentioned above, units in the embodiment controller 1900 may be hardware, software, or a combination thereof. In one embodiment, one or more of the embodiment controller 1900 are integrated circuits, such as field programmable gate arrays (FPGAs) or application-specific integrated circuits (ASICs).

Figure 20:
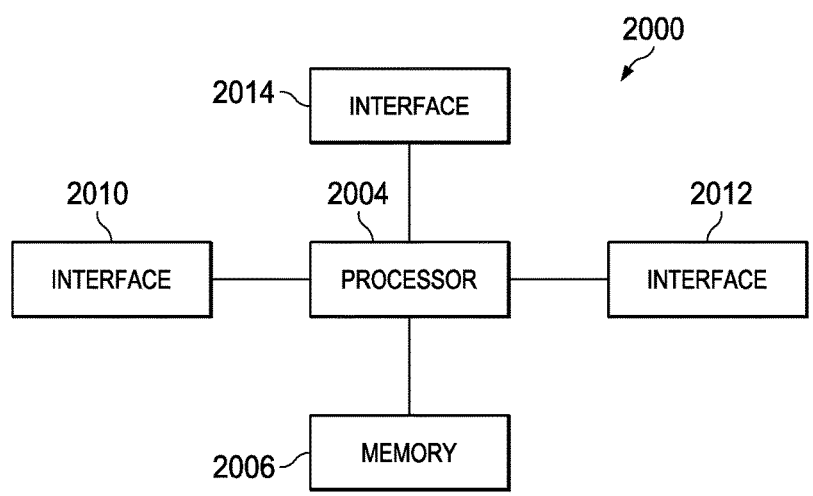
FIG. 20 illustrates a diagram of an embodiment processing system.

FIG. 20 is a block diagram of an embodiment processing system 1200 for performing methods described herein, which may be installed in a host device. As shown, the processing system 2000 includes a processor 2004, a memory 2006, and interfaces 2010-2014, which may (or may not) be arranged as shown in FIG. 20. The processor 2004 may be any component or collection of components adapted to perform computations and/or other processing related tasks, and the memory 2006 may be any component or collection of components adapted to store programming and/or instructions for execution by the processor 2004. In an embodiment, the memory 2006 includes a non-transitory computer readable medium. The interfaces 2010, 2012, 2014 may be any component or collection of components that allow the processing system 2000 to communicate with other devices/components and/or a user. For example, one or more of the interfaces 2010, 2012, 2014 may be adapted to communicate data, control, or management messages from the processor 2004 to applications installed on the host device and/or a remote device. As another example, one or more of the interfaces 2010, 2012, 2014 may be adapted to allow a user or user device (e.g., personal computer (PC), etc.) to interact/communicate with the processing system 2000. The processing system 2000 may include additional components not depicted in FIG. 20, such as long term storage (e.g., non-volatile memory, etc.).

In some embodiments, the processing system 2000 is included in a network device that is accessing, or part otherwise of, a telecommunications network. In one example, the processing system 2000 is in a network-side device in a wireless or wireline telecommunications network, such as a base station, a relay station, a scheduler, a controller, a gateway, a router, an applications server, or any other device in the telecommunications network. In other embodiments, the processing system 2000 is in a user-side wireless device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 21:
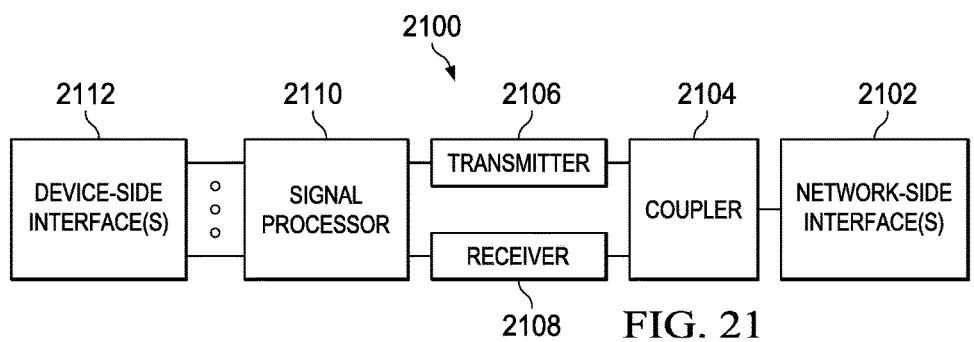
FIG. 21 illustrates a diagram of an embodiment transceiver.

In some embodiments, one or more of the interfaces 2010, 2012, 2014 connects the processing system 2000 to a transceiver adapted to transmit and receive signaling over the telecommunications network. FIG. 21 is a block diagram of a transceiver 2100 adapted to transmit and receive signaling over a telecommunications network. The transceiver 2100 may be installed in a host device. As shown, the transceiver 2100 comprises a network-side interface 2102, a coupler 2104, a transmitter 2106, a receiver 2108, a signal processor 2110, and a device-side interface 2112. The network-side interface 2102 may include any component or collection of components adapted to transmit or receive signaling over a wireless or wireline telecommunications network. The coupler 2104 may include any component or collection of components adapted to facilitate bi-directional communication over the network-side interface 2102. The transmitter 2106 may include any component or collection of components (e.g., up-converter, power amplifier, etc.) adapted to convert a baseband signal into a modulated carrier signal suitable for transmission over the network-side interface 2102. The receiver 2108 may include any component or collection of components (e.g., down-converter, low noise amplifier, etc.) adapted to convert a carrier signal received over the network-side interface 2102 into a baseband signal. The signal processor 2110 may include any component or collection of components adapted to convert a baseband signal into a data signal suitable for communication over the device-side interface(s) 2112, or vice-versa. The device-side interface(s) 2112 may include any component or collection of components adapted to communicate data-signals between the signal processor 2110 and components within the host device (e.g., the processing system 2000, local area network (LAN) ports, etc.).

The transceiver 2100 may transmit and receive signaling over any type of communications medium. In some embodiments, the transceiver 2100 transmits and receives signaling over a wireless medium. For example, the transceiver 2100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2102 comprises one or more antenna/radiating elements. For example, the network-side interface 2102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A non-transitory computer-readable medium storing programming for execution by a processor, the programming including instructions to:
    receive, by a controller, a key quality indicator (KQI) and a set of key performance indicators (KPIs) associated with wireless transmissions in a wireless network area during a first period, wherein the KQI indicates quality measurement values for a set of discrete time intervals, and wherein each KPI in the set of KPIs indicates different performance measurement values for the set of discrete time intervals;
    remove, by the controller, from the set of KPIs, at least one KPI in accordance with hit-ratios between the KQI and KPIs in the set of KPIs, each of the hit-ratios indicating a ratio between (i) a number of discrete time intervals, during the set of discrete time intervals, in which both a value of the KQI exceeds a quality threshold and a value of a corresponding KPI in the set of KPIs exceeds a corresponding performance threshold and (ii) a total number of discrete time intervals, during the set of discrete time intervals, in which the value of the KQI exceeds the quality threshold;
    adjust, by the controller, configuration parameters used to communicate wireless transmissions in the wireless network area during a second period in accordance with relationships between the KQI and remaining KPIs in the set of KPIs; and
    send, by the controller, the adjusted configuration parameters to at least one base station, the adjusted configuration parameters being used to communicate at least one wireless transmission by the at least one base station in the wireless network area during the second period.

2. The non-transitory computer-readable medium of claim 1, wherein the instructions to remove, from the set of KPIs, the at least one KPI in accordance with hit-ratios between the KQI and KPIs in the set of KPIs include instructions to:
    remove, from the set of KPIs, KPIs having a hit-ratio below a hit-ratio threshold.

3. The non-transitory computer-readable medium of claim 1, wherein the programming further includes instructions to:
    calculate slopes of linear regression between the KQI and KPIs in the set of KPIs, each slope of linear regression indicating a degree in which a change in a value of the KQI is attributable to changes in a value of a corresponding KPI in the set of KPIs; and
    remove, from the set of KPIs, KPIs having a slope of linear regression below a threshold slope prior to adjusting the configuration parameters of the wireless network area in accordance with relationships between the KQI and remaining KPIs in the set of KPIs.

4. The non-transitory computer-readable medium of claim 1, wherein the programming further includes instructions to:
    determine global performance thresholds based on sets of KPIs reported by access points in a group of wireless network areas that includes the wireless network area, each of the global performance thresholds corresponding to a different KPI in the set of KPIs associated with wireless transmissions in the wireless network area; and
    remove, from the set of KPIs, KPIs failing to exceed a corresponding one of the global performance thresholds prior to adjusting the configuration parameters of the wireless network area in accordance with relationships between the KQI and remaining KPIs in the set of KPIs.

5. The non-transitory computer-readable medium of claim 4, wherein the global performance threshold comprises between an upper percentage of values for each type of KPI reported by the access points, the upper percentage being between a top twenty percent and a top five percent of KPI values.

6. The non-transitory computer-readable medium of claim 1, wherein the programming further includes instructions to:
    determine a causal relationship between a first KPI in the set of KPIs and a second KPI in the set of KPIs, the causal relationship indicating the degree to which a change in a value of the first KPI impacts a value of the second KPI; and
    remove, from the set of KPIs, the second KPI when the causal relationship between the first KPI and the second KPI satisfies a causality criteria prior to adjusting the configuration parameters of the wireless network area in accordance with relationships between the KQI and remaining KPIs in the set of KPIs.

7. The non-transitory computer-readable medium of claim 1, wherein the programming further includes instructions to:
    determine prediction impact scores for the set of KPIs, each of the prediction impact scores indicating a degree of accuracy impact in which a value of a corresponding KPI in the set of KPIs can be used to predict a value of the KQI; and
    remove, from the set of KPIs, KPIs having a prediction impact score below a prediction impact threshold prior to adjusting the configuration parameters of the wireless network area in accordance with relationships between the KQI and remaining KPIs in the set of KPIs.

8. The non-transitory computer-readable medium of claim 7, wherein the prediction impact scores are based on prediction error rates associated with KPIs in the set of KPIs.

9. The non-transitory computer-readable medium of claim 7, wherein the prediction impact scores are based on goodness of fit metrics associated with KPIs in the set of KPIs.

10. The non-transitory computer-readable medium of claim 7, wherein the prediction impact scores are based on a combination of prediction error rates and goodness of fit metrics associated with KPIs in the set of KPIs.

11. A method for adjusting parameters of a wireless network, the method comprising:

receiving, by a controller, a key quality indicator (KQI) and a set of key performance indicators (KPIs) associated with wireless transmissions in a wireless network area during a first period, wherein the KQI indicates quality measurement values for a set of discrete time intervals, and wherein each KPI in the set of KPIs indicates different performance measurement values for the set of discrete time intervals;

removing, by the controller, from the set of KPIs, at least one KPI in accordance with hit-ratios between the KQI and KPIs in the set of KPIs, each of the hit-ratios indicating a ratio between (i) a number of discrete time intervals, during the set of discrete time intervals, in which both a value of the KQI exceeds a quality threshold and a value of a corresponding KPI in the set of KPIs exceeds a corresponding performance threshold and (ii) a total number of discrete time intervals, during the set of discrete time intervals, in which the value of the KQI exceeds the quality threshold;

adjusting, by the controller, configuration parameters used to communicate wireless transmissions in the wireless network area during a second period in accordance with relationships between the KQI and remaining KPIs in the set of KPIs; and sending, by the controller, the adjusted configuration parameters to at least one base station, the adjusted configuration parameters being used to communicate at least one wireless transmission by the at least one base station in the wireless network area during the second period.

12. The method of claim 11, wherein removing, from the set of KPIs, the at least one KPI in accordance with hit-ratios between the KQI and KPIs in the set of KPIs comprises:
removing, from the set of KPIs, KPIs having a hit-ratio below a hit-ratio threshold.

13. The method of claim 11, further comprising:
calculating slopes of linear regression between the KQI and KPIs in the set of KPIs, each slope of linear regression indicating a degree in which a change in a value of the KQI is attributable to changes in a value of a corresponding KPI in the set of KPIs; and
removing, from the set of KPIs, KPIs having a slope of linear regression below a threshold slope prior to adjusting the configuration parameters of the wireless network area in accordance with relationships between the KQI and remaining KPIs in the set of KPIs.

14. The method of claim 12, further comprising:
determining global performance thresholds based on sets of KPIs reported by access points in a group of wireless network areas that includes the wireless network area, each of the global performance thresholds corresponding to a different KPI in the set of KPIs associated with wireless transmissions in the wireless network area; and
removing, from the set of KPIs, KPIs failing to exceed a corresponding one of the global performance thresholds prior to adjusting the configuration parameters of the wireless network area in accordance with relationships between the KQI and remaining KPIs in the set of KPIs.

15. A controller comprising:
a processor; and
a non-transitory computer readable storage medium storing programming for execution by the processor, the programming including instructions to:
receive a key quality indicator (KQI) and a set of key performance indicators (KPIs) associated with wireless transmissions in a wireless network area during a first period, wherein the KQI indicates quality measurement values for a set of discrete time intervals, and wherein each KPI in the set of KPIs indicates different performance measurement values for the set of discrete time intervals;
remove, from the set of KPIs, at least one KPI in accordance with hit-ratios between the KQI and KPIs in the set of KPIs, each of the hit-ratios indicating a ratio between (i) a number of discrete time intervals, during the set of discrete time intervals, in which both a value of the KQI exceeds a quality threshold and a value of a corresponding KPI in the set of KPIs exceeds a corresponding performance threshold and (ii) a total number of discrete time intervals, during the set of discrete time intervals, in which the value of the KQI exceeds the quality threshold;
adjust configuration parameters used to communicate wireless transmissions in the wireless network area during a second period in accordance with relationships between the KQI; and
send the adjusted configuration parameters to at least one base station, the adjusted configuration parameters being used to communicate at least one wireless transmission by the at least one base station in the wireless network area during the second period.

16. The controller of claim 15, wherein the instructions to remove, from the set of KPIs, the at least one KPI in accordance with hit-ratios between the KQI and KPIs in the set of KPIs include instructions to:
remove, from the set of KPIs, KPIs having a hit-ratio below a hit-ratio threshold.

17. The controller of claim 15, wherein the programming further includes instructions to:
calculate slopes of linear regression between the KQI and KPIs in the set of KPIs, each slope of linear regression indicating a degree in which a change in a value of the KQI is attributable to changes in a value of a corresponding KPI in the set of KPIs; and
remove, from the set of KPIs, KPIs having a slope of linear regression below a threshold slope prior to adjusting the configuration parameters of the wireless network area in accordance with relationships between the KQI and remaining KPIs in the set of KPIs.

* * * * *